March 20, 1934.　　　C. THOMAE　　　1,951,743
METHOD OF PRODUCING A PREPARED BREAKING POINT IN AMPULLÆ
Filed May 28, 1930
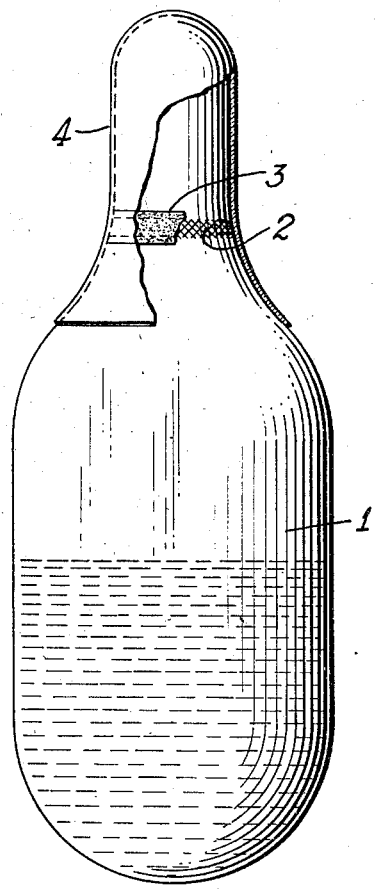
INVENTOR
CARLOS THOMAE
BY
ATTORNEYS Patented Mar. 20, 1934

1,951,743

UNITED STATES PATENT OFFICE

1,951,743

METHOD OF PRODUCING A PREPARED BREAKING POINT IN AMPULLÆ

Carlos Thomae, Frankfort-on-the-Main, Germany, assignor to ISO Gesellschaft m. b. H., Frankfort-on-the-Main, Germany Application May 28, 1930, Serial No. 456,805
In Germany April 25, 1930

2 Claims. (Cl. 128—216)

Glass ampullæ of known type, such as generally used for packing injection liquids, are closed by smelting. Such ampullæ must be scratched or roughened at the point at which they are to be broken off, by means of a glass file or a corundum stone.

Different types of ampullæ prepared for breaking in accordance with prior art have not been satisfactory due to the fact that the incision was either too deep, in which case many ampullæ become useless on account of premature breaking, or the incision was not deep and wide enough, in which case the breaking off does not function properly, the glass can be splintered, and the physician is liable to be injured. Even ampullæ, the breaking point of which had been prepared by means of stress zones and the like, show a high percentage of premature breakage. Ampullæ of this type, which had been provided with a breaking point by the glass blower, were more liable to break prematurely, as they had to withstand the cleaning, sterilizing and filling, whereas the ampullæ which are scratched or roughened only after the smelting process, have to withstand merely the packing and the transport. Many ampullæ break at the prepared point during their transport to other countries, owing to the change of temperature.

The main object of this invention is to eliminate the above mentioned drawbacks and to provide an ampulla which can be opened without the aid of a file, or similar instruments.

According to the new method the portion of the ampulla at which it has to be broken off is dipped into a solution of cellulosic composition, for instance "cellophane" (i. e. a cellulose film obtained by the precipitation of a viscose solution with ammonium salts), lacquers or similar substances which are permeable to light, so that after drying a thin coating of these substances adheres as a supporting substance onto and around the breaking point.

The whole ampulla can be dipped into the solution, or the previously prepared breaking point of the empty ampulla may be treated as described, the filled and closed ampulla being then dipped again into the solution.

As at the breaking off of the ampulla neck the pressure to be exerted upon the same has to act on the side opposite the incision, the scratched point being difficultly recognizable, it is advisable to mark the scratched point prior to the immersion by rubbing it with paint.

An ampulla made in accordance with this invention is shown in side elevation in the accompanying drawing. In this drawing an ampulla 1 is provided with a scratched portion 2 which is covered with paint 3. A part of the ampulla 1, which part comprises the scratched portion 2, is covered with a transparent coating 4 formed from a solution of a cellulosic derivative such as cellulosic lacquers. A part of the paint 3 and of the transparent coating 4 is not shown in the drawing to illustrate more clearly wherein these materials are applied.

I claim:—

1. A method of treating ampullæ, comprising in combination the steps of weakening a part of the ampulla, covering the weakened part with paint, coating said part with a solution of a transparent material of the class comprising "cellophane" and lacquers, and drying the coating.

2. A method of treating ampullæ, comprising in combination the steps of weakening a part of the empty ampulla, covering the weakened part with paint, dipping the ampulla into a solution of a transparent material of the class comprising "cellophane" and lacquers, closing the filled ampulla, and dipping it again into said solution.

CARLOS THOMAE.